United States Patent
Tsuyama et al.

[11] Patent Number: 6,105,698
[45] Date of Patent: Aug. 22, 2000

[54] STRUCTURE FOR MAINTAINING PASSENGER SPACE IN CAB

[75] Inventors: Kouichi Tsuyama; Toshihiro Murakami; Kazuyoshi Kano; Tetsuya Yamaguchi, all of Kanagawa, Japan

[73] Assignee: Isuzu Motors Limited, Tokyo, Japan

[21] Appl. No.: 09/256,098

[22] Filed: Feb. 24, 1999

[30] Foreign Application Priority Data

Feb. 27, 1998 [JP] Japan .................................. 10-062024

[51] Int. Cl.[7] .......................... B62D 23/00; B62D 33/06; B60K 5/00
[52] U.S. Cl. ...................... 180/89.1; 180/89.12; 180/232
[58] Field of Search ................................... 280/781, 784; 180/89.1, 89.12, 232

[56] References Cited

U.S. PATENT DOCUMENTS

| | | | |
|---|---|---|---|
| 2,720,931 | 10/1955 | Thannhauser | 180/89.1 |
| 3,451,574 | 6/1969 | Weichel | 180/89.1 |
| 3,667,565 | 6/1972 | Steiner et al. | 180/89.1 |
| 4,732,229 | 3/1988 | Lucht | 180/89.1 |
| 5,673,767 | 10/1997 | Uno et al. | 180/89.12 |

*Primary Examiner*—Paul N. Dickson
*Assistant Examiner*—Matthew Luby
*Attorney, Agent, or Firm*—Sughrue, Mion, Zinn, Macpeak & Seas, PLLC

[57] ABSTRACT

When an external force acts on a front side of a cab 10 at the time of a car collision or the like, the front side of the cab is deformed, so that a passenger space 15 is reduced from a value C to a value d. On the other hand, a power plant 3 advances because of an inertia force, and an oil pan 2 of the power plant 3 is brought into striking engagement with a suspension cross member 1, and therefore is prevented from further advancing. The value of the distance b between the power plant 3 and a rising portion 16 of a floor panel 14, as well as the value of the distance a between the suspension cross member 1 and the oil pan 2, is suitably determined, and also deforming properties of deformable members of the oil pan 2 are suitably determined. By doing so, the reduction or deformation of the passenger space 15 from the power plant side is prevented, thereby securing the safety of the passengers.

4 Claims, 5 Drawing Sheets

STRUCTURE FOR MAINTAINING PASSENGER SPACE IN CAB

BACKGROUND OF INVENTION

1. Field of the Invention

This invention relates to a cab passenger space-maintaining structure capable of maintaining or keeping a passenger space in a cab of a cab-over type(forward control) vehicle at above a predetermined level upon application of an external force due to a collision or the like.

2. Related art

In the case of a cab-over type vehicle in which a power plant is mounted under a cab, when an external force acts on a front side of the cab upon collision or the like, the front side of the cab is deformed, and also, in some cases, the power plant, including an engine and a transmission, moves forward because of the inertia force to deform the rear side of the cab, thereby narrowing a passenger space provided before the collision. Therefore, in the prior art, various means have been used in order to reduce the degree of deformation of the cab. For example, the cab itself was reinforced, and a reinforcing member was mounted on a frame, and various cushioning means were provided for absorbing an impact energy.

Although the conventional passenger space-maintaining structures have their respective features, and are effective, each of these structures uses some reinforcing member or the like, and therefore has problems that the cost is high and that the weight is increased.

SUMMARY OF INVENTION

It is an object of this invention to provide a cab passenger space-maintaining structure which is capable of maintaining or keeping a passenger space in a cab at above a predetermined level at the time of a collision or the like without the use of any special separate member.

The above object of the present invention has been achieved by a cab passenger space-maintaining structure for maintaining a passenger space in a cab of a cab-over type vehicle at a predetermined level when the cab is deformed from its front and rear sides upon application of an external force to the cab, wherein that the distance a between a cross member of a frame, supporting the cab, and an interfering portion of a power plant for interference with the cross member, is smaller than the distance b between a rear-side panel of the cab, forming the passenger space, and a front side of the power plant, the power plant including an engine and a transmission; and wherein the interfering portion of the power plant comprises a deformable member. More specifically, the amount δ of deformation of the interfering portion, developing upon striking engagement with the cross-member, is at least smaller than the value of (b−a). The cross member is a suspension cross member, and the interfering portion of the power plant is an oil pan of the engine.

The positional relation between the conventional cross-member, serving as a reinforcing member for the frame, and the power plant disposed for interference with the cross-member, as well as the positional relation between the power plant and the cab, is suitably determined, and further the degree of deformation of the interfering portion of the power plant, comprising the deformable member, is suitably determined. With this construction, the amount of deformation of the passenger space from the rear side upon application of an external force due to a collision or the like can be reduced. As a result, the passenger space can be maintained or kept at the predetermined level even upon application of an external force due to a collision or the like.

DETAILED DESCRIPTION OF PREFERRED EMBODIMENTS

Figure 4:
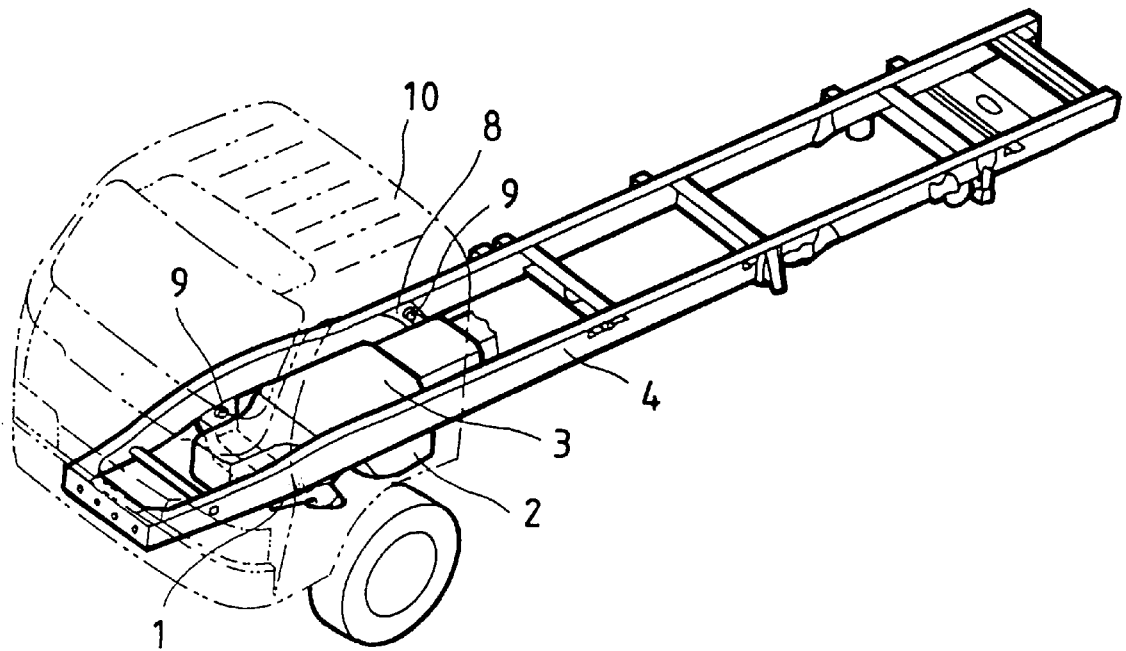
FIG. 4 is a perspective view showing a vehicle frame, to which the present invention is applied, and a power plant, a cab and so on which are mounted on the frame.
Figure 5:
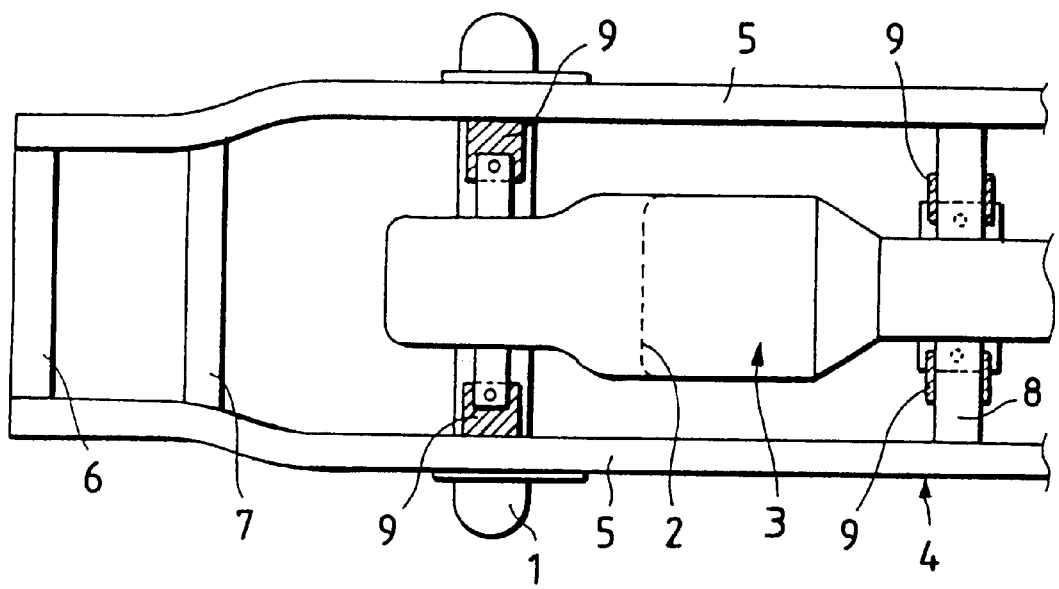
FIG. 5 is a plan view showing the construction and arrangement of the vehicle frame, to which the present invention is applied, and the power plant.
Figure 6:
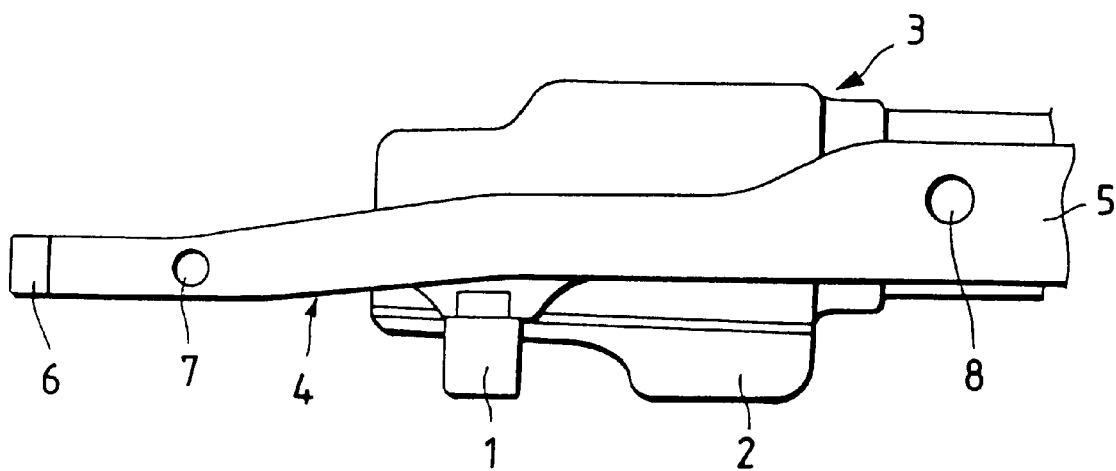
FIG. 6 is a top plan view of FIG. 4.

A structure for maintaining a passenger space in a cab, which is a preferred embodiment of the invention, will now be described in detail with reference to the drawings. Although this embodiment will be described below with respect to a cab-over type vehicle having an independent-suspension mechanism, the invention is not limited to such a construction. First, the construction of a frame 4 of the vehicle, as well as the construction of a power plant 3 mounted on the frame 4, will be described briefly with reference to FIG. 4, and then a mounting construction for the power plant 3, mounted on the frame 4 through resilient suspension mechanism portions 9, and its positional relation and etc., will be described with reference to FIGS. 5 and 6.

The frame 4 comprises a pair of juxtaposed, suitably spaced side frames 5 and 5, and cross members 6, 7 and 8 mounted on and extending between these side frames. Particularly in the case of the vehicle having the independent-suspension mechanism, a suspension cross member 1 of extremely-high rigidity is mounted on the side frames 5 and 5, and is disposed in the vicinity of a front axle. The power plant 3, including an engine and a transmission, is mounted in the vicinity of the suspension cross member 1, and the side frames 5 and 5 are resiliently supported through the resilient suspension mechanism portions 9. An oil pan 2 is provided on the lower side of the power plant 3. In this embodiment, although the oil pan 2 of the power plant 3 is disposed in opposed relation to the suspension cross member 1, and serves as an interfering portion, the invention is not limited to such a construction.

The deformation of the cab, caused when an external force acts on the cab upon collision or the like, as well as a change of the passenger space caused by this deformation, will be described with reference to FIGS. 1 and 2. Dotsand-dash lines indicate a condition before the deformation of the cab 10. The cab 10 is formed by a front panel 11, a roof panel 12, a rear panel 13, a floor panel 14 and etc., and the passenger space 15 to be occupied by the passengers or occupants is formed within the cab 10. For the simplicity of the description, the passenger space 15 is represented by the distance C between a rising portion 16 of the floor panel 14 and the front panel 11.

The position of the front panel 11 in the event of a head-on collision of the cab 10 is schematically indicated in a broken line. If the rear side of the cab 10 is not deformed upon collision or the like, the distance c of the passenger space 15 is reduced into a smaller distance d. The deformation in an amount of (c–d) is inevitable upon collision, and the purpose of the present invention is to prevent the passenger space from being reduced to below the value d. If the passenger space is maintained at the distance d, any particular problem will not be countered. By suitably using conventional techniques, the deformation of the front panel 11 upon collision can be kept to below the value (c–d).

Figure 1:
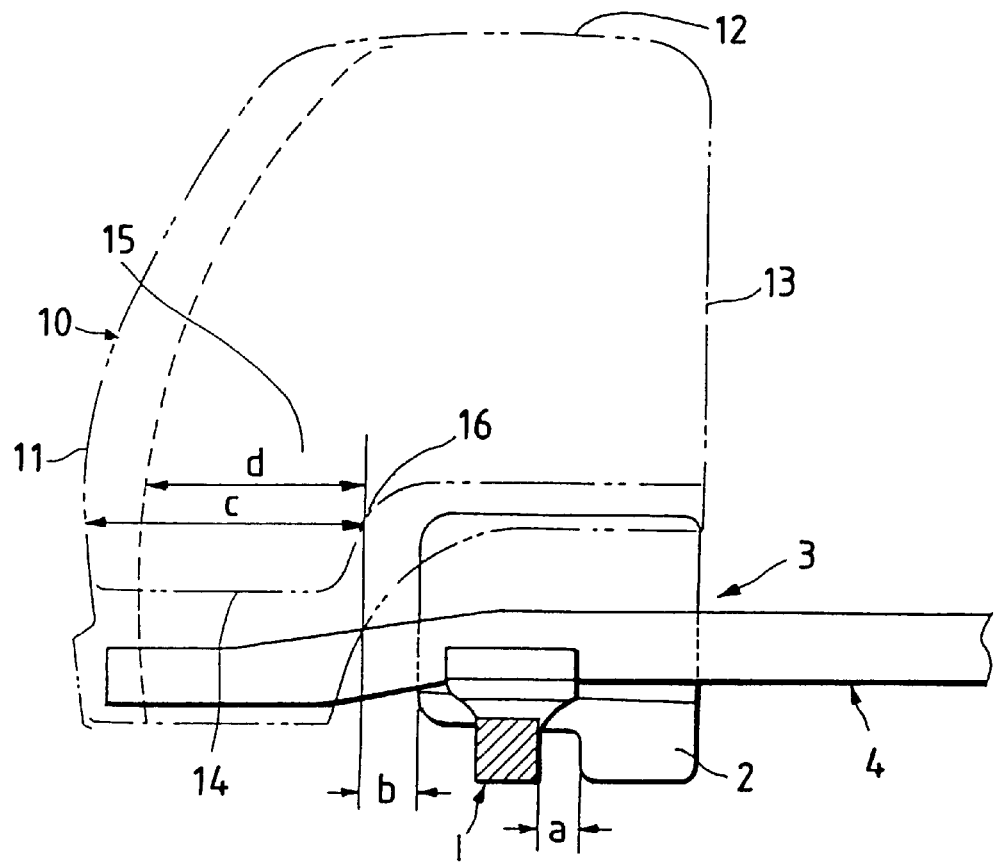
FIG. 1 is a schematic view showing a change of a passenger space upon application of an external force in the present invention.

As shown in FIG. 1, in the normal condition, the distance between the power plant 3 and the rising portion 16 of the floor panel 14 of the cab 10 is represented by A, and in this case, the distance between the suspension cross member 1 and the oil pan (interfering portion) 2 of the power plant 3 is represented by a. In the present invention, the positions of the suspension cross member 1, the power plant 3 and the rising portion 16 (of the floor panel of the cab 10) relative to one another are so determined that at least the formula, b–a>0, can be established. More preferably, it is necessary to establish the formula, b–a–δ. δ represents the amount of deformation of the oil pan 2 (interfering portion), serving as the deformable member, upon collision or the like.

Figure 2:
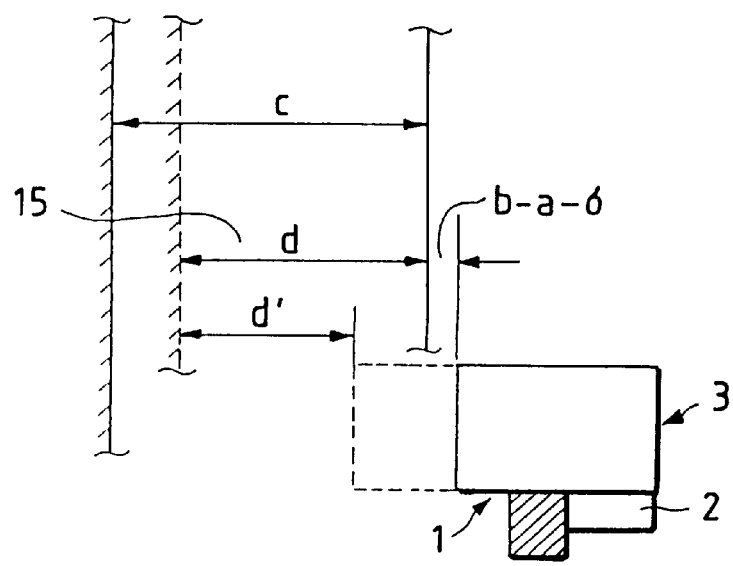
FIG. 2 is a schematic view showing the difference in passenger space between a conventional construction and the present invention.

As shown in FIG. 2, when the power plant 3 is moved forward because of its inertia force upon application of an external force due to a collision or the like, the oil pan 2, serving as the interfering portion of the power plant 3, is caused to interfere with the suspension cross member 1 of high rigidity. thereby substantially limiting a further movement of the power plant 3. If the interference of the oil pan 2 with the suspension cross member 1 does not occur, the power plant 3 will move to a position indicated in a broken line in FIG. 2, so that the passenger space is reduced into a distance d' smaller than the above-mentioned distance A. In order to prevent this, the suspension cross member 1 and the oil pan 2 are caused to interfere with each other so as to secure at least the distance d.

Figure 3:
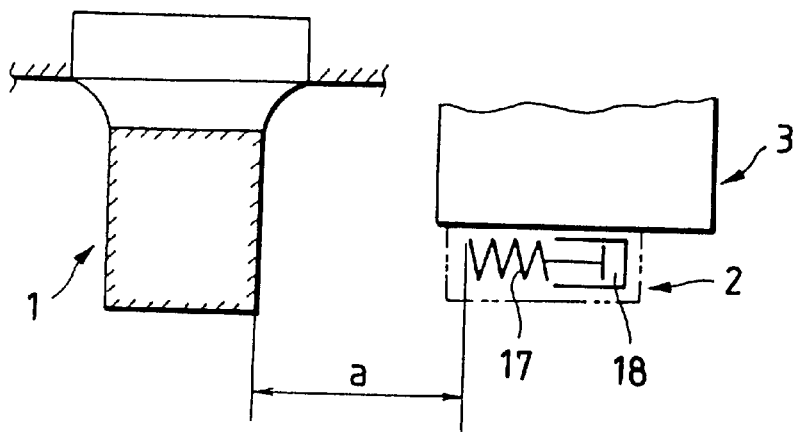
FIG. 3 is a schematic view showing deformable members of an interfering portion of the invention.

As shown in FIG. 3, the oil pan 2 comprises deformable members, and more specifically comprises a spring system 17 and a damper system 18 as schematically shown in FIG. 3. When the oil pan 2 interferes with the suspension cross member 1, deflection δ, determined by the spring constant of the spring system 17 and the damping coefficient of the damper system 18, occurs. Therefore, when the power plant 3 abuts against the suspension cross member 1, the power plant 3 further advances by an amount corresponding to the value of δ. Therefore, the forward movement of the power plant 3 at the time of a collision or the like is represented by a+δ, and if this movement amount is less than 2, the power plant 3 will not abut against the rising portion 16 of the floor panel 14. Therefore, the reduction of the passenger space 15 from the rear side of the cab 10 will not occur.

Figure 7:
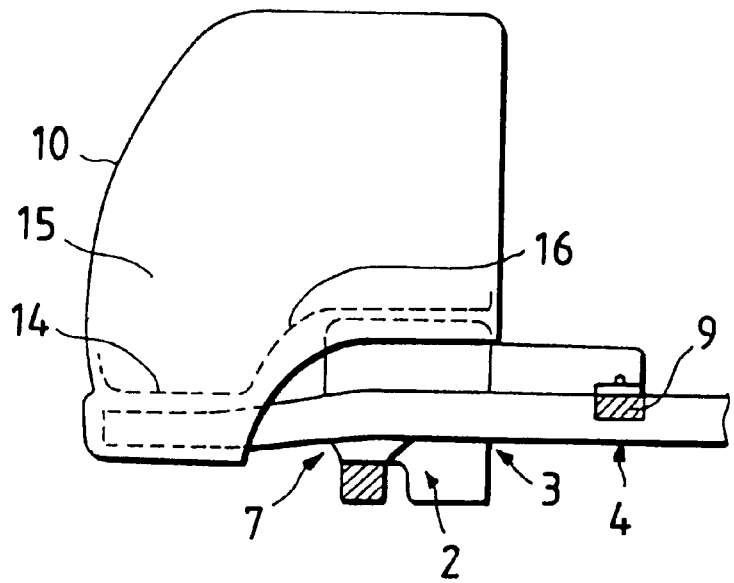
FIG. 7 is a schematic view showing the positions of the cab, the frame and the power plant relative to one another in a condition in which an external force is not applied.
Figure 8:
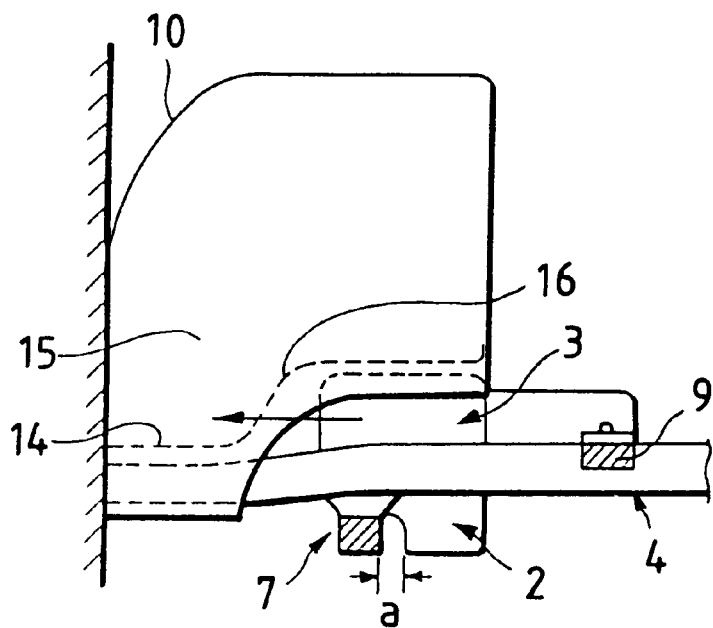
FIG. 8 is a schematic view showing a change of the passenger space when an external force is applied to the front side of the vehicle.
Figure 9:
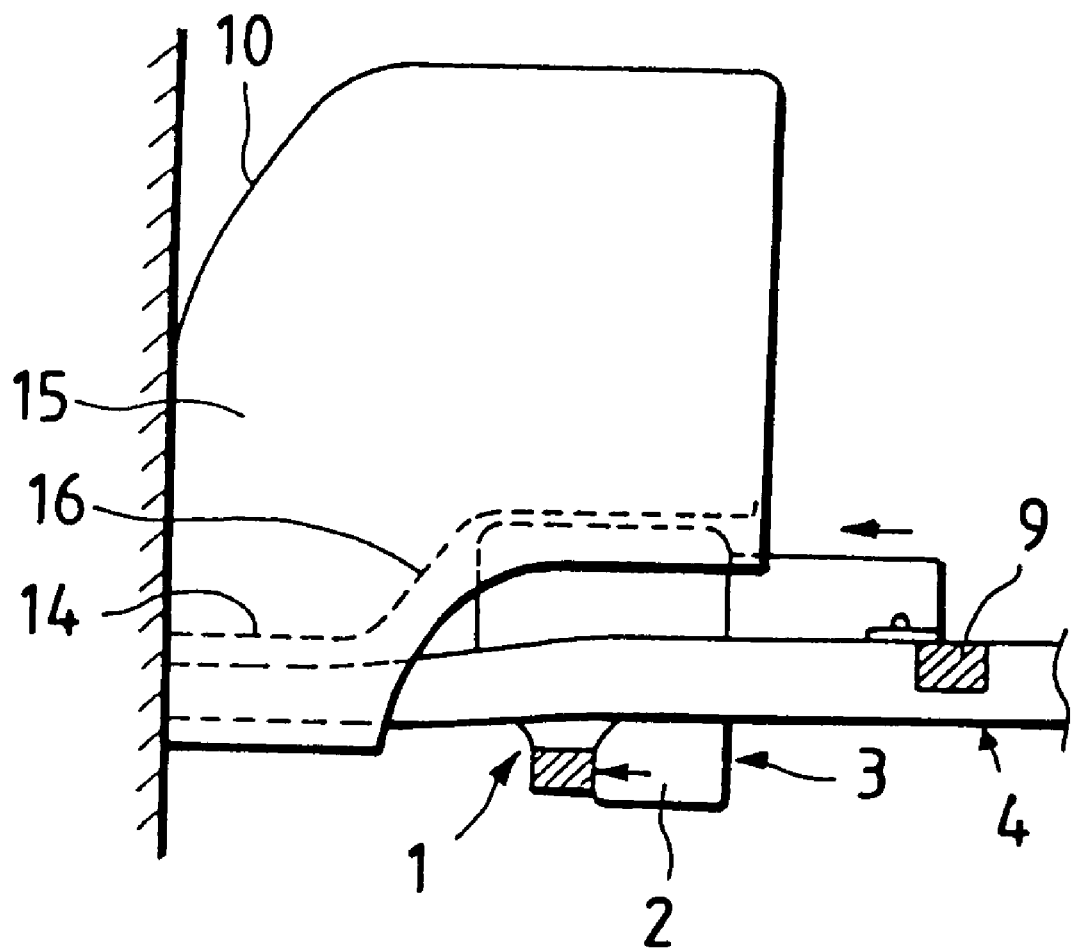
FIG. 9 is a schematic view showing the movement of the power plant and the passenger pace upon application of an external force.

FIG. 7 schematically shows the positions of the cab 10, the frame 4 and the power plant 3 relative to one anther in a condition in which an external force due to a collision or the like is not applied. The power plant 3 is fixed to the frame 4 by the resilient suspension mechanism portions 9 (shown schematically). FIG. 8 shows a condition in which the front side of the cab 10 is deformed by a collision or the like. In this condition, although an inertia force F acts on the power plant 3, the power plant 3 hardly advances since the power plant 3 is fixed to the frame through the resilient suspension mechanism portions 9 as described above. However, when the inertia force of a magnitude larger than a predetermined value acts on the power plant 3, the resilient suspension mechanism portions 9 are deformed, so that the power plant 3 are displaced relative to the frame 4 as shown in FIG. 9. As a result, the power plant 3 advances until the oil pan 2 is brought into interference with the suspension cross member 1.

However, even in the condition shown in FIG. 9, if the value (b–a–δ) is maintained as described above for FIG. 2, the power plant 3 will not interfere with the rising portion 16 of the floor panel 14. As a result, the passenger space 15 is kept at the distance d. And besides, as shown in FIGS. 8 and 9, a timing lag occurs during the time when the power plant 3 moves the distance a, and the inertia force is reduced also during this time. Furthermore, an impact energy, developing between the suspension cross member and the oil pan 2, is absorbed by the deformable members of the oil pan 2. Therefore, the oil pan 2 is only deformed. Moreover, the load on the frame is reduced because of a timing lag due to the deformation of the oil pan 2, thereby secondarily reducing the deformation of the cab.

As described above, in the present invention, the positions of the rising portion 16 (of the floor panel 14 of the cab 10), the suspension cross member 1 and the power plant 3 are suitably controlled, and the deforming properties of the oil pan 2 (serving as the interfering portion) are suitably determined, and by doing so, the passenger space can be maintained at above the predetermined level upon application of an external force due to a collision or the like.

In the above description, although the suspension cross member 1 is used as the cross member, and the oil pan 2 is used as the interfering portion of the power plant 3, the invention is not limited to such a construction.

In the cab passenger space-maintaining structure of the present invention, the amount of forward movement of the power plant upon application of an external force, which forward movement is related to the reduction of the passenger space, is limited to not more than a predetermined level without the use of any special separate member, thereby reducing the reduction of the passenger space from the rear side, and therefore the passenger space in the cab can be maintained at the predetermined level. Since any particular separate member is not used, this structure can be easily achieved, and the cost and the weight are not increased. The time period from the application of the external force to the interference of the power plant with the cross member can be controlled, and the timing of applying the weight of the power plant as a load can be controlled, and besides the inertia force, acting on the power plant, can be reduced.

In the cab passenger space-maintaining structure of the present invention, the amount of deformation of the interfering portion, interfering with the cross member, is limited to not more than the predetermined value, and by doing so, the passenger space in the cab can be maintained more positively, and besides the impact energy can b absorbed.

In the cab passenger space-maintaining structure of the present invention, the suspension cross member is used as the cross member, and the oil pan is used as the interfering portion of the power plant. Therefore, the conventional members can be used, and any particular separate member is not needed, and the cost and the weight are not increased.

What is claimed is:

1. A cab passenger space-maintaining structure for maintaining a passenger space in a cab of a cab-over type vehicle at a predetermined level when the cab is deformed from its front and rear sides upon application of an external force to the cab, wherein the distance a defined between a cross member of a frame, supporting said cab, and an interfering portion of a power plant for interference with said cross member, is smaller than a distance b defined between a rear-side panel of said cab, forming said passenger space, and a front side of said power plant, said power plant including an engine and a transmission, and said interfering portion of said power plant is formed by a deformable member.

2. A cab passenger space-maintaining structure according to claim 1, in which an amount $\delta$ of deformation of said interfering portion, developing upon striking engagement with said cross-member, is at least smaller than the value of (b−a).

3. A cab passenger space-maintaining structure according to claim 1, in which said cross member is a suspension cross member, and said interfering portion of said power plant is an oil pan of the engine.

4. A cab passenger space-maintaining structure according to claim 2, in which said cross member is a suspension cross member, and said interfering portion of said power plant is an oil pan of the engine.

* * * * *